US011913474B2

United States Patent
(12) United States Patent
Jones et al.

(10) Patent No.: US 11,913,474 B2
(45) Date of Patent: Feb. 27, 2024

(54) QUICK CONNECT ASSEMBLY FOR CEILING FAN

(71) Applicant: HUNTER FAN COMPANY, Memphis, TN (US)

(72) Inventors: Rickey Thomas Jones, Memphis, TN (US); James Caleb McMillen, Hernado, MS (US)

(73) Assignee: Hunter Fan Company, Memphis, TN (US)

(*) Notice: Subject to any disclaimer, the term of this patent is extended or adjusted under 35 U.S.C. 154(b) by 0 days.

(21) Appl. No.: 17/950,745

(22) Filed: Sep. 22, 2022

(65) Prior Publication Data

US 2023/0018062 A1 Jan. 19, 2023

Related U.S. Application Data

(63) Continuation of application No. 16/832,311, filed on Mar. 27, 2020, now Pat. No. 11,499,570, which is a (Continued)

(51) Int. Cl.

| | |
|---|---|
| ***F04D 29/60*** | (2006.01) |
| ***F04D 25/06*** | (2006.01) |
| ***F04D 25/08*** | (2006.01) |
| ***F21V 21/03*** | (2006.01) |
| ***H01R 13/627*** | (2006.01) |

(Continued)

(52) U.S. Cl.

CPC ....... *F04D 29/601* (2013.01); *F04D 25/0693* (2013.01); *F04D 25/088* (2013.01); *F21V 21/03* (2013.01); *H01R 13/6278* (2013.01); *H02G 3/20* (2013.01); *F21V 23/04* (2013.01); *F21V 33/0096* (2013.01); *H01R 24/66* (2013.01)

(58) Field of Classification Search

CPC .. F04D 29/601; F04D 25/0693; F04D 25/088; F21V 21/03; F21V 23/04; F21V 33/0096; H01R 13/6278; H01R 24/66; H02G 3/20

See application file for complete search history.

(56) References Cited

U.S. PATENT DOCUMENTS

| | | |
|---|---|---|
| 4,426,126 A | 1/1984 | De Vos et al. |
| 4,518,314 A | 5/1985 | Schultz |

(Continued)

FOREIGN PATENT DOCUMENTS

| | | |
|---|---|---|
| CN | 203309726 U | 11/2013 |
| CN | 205807364 U | 12/2016 |

(Continued)

OTHER PUBLICATIONS

Chinese Office Action corresponse to Chinese Application No. 201710767664.4 dated Mar. 27, 2019.
https://en.wikipedia.org/wiki/Counterbore (Year: 2015).

*Primary Examiner* — Terrell L McKinnon
*Assistant Examiner* — Ding Y Tan
(74) *Attorney, Agent, or Firm* — McGarry Bair PC

(57) ABSTRACT

A quick connect mounting assembly for a ceiling fan. The quick connect mounting assembly includes two releasably attachable plates that are easily interconnected to mechanically couple elements of a ceiling fan. The quick connect mounting assembly can be used to mount a ceiling fan switch housing to a ceiling fan motor assembly.

19 Claims, 10 Drawing Sheets

Related U.S. Application Data continuation of application No. 15/667,700, filed on Aug. 3, 2017, now Pat. No. 10,641,291.

(60) Provisional application No. 62/381,893, filed on Aug. 31, 2016.

(51) Int. Cl.

| | |
|---|---|
| ***H02G 3/20*** | (2006.01) |
| ***F21V 23/04*** | (2006.01) |
| ***F21V 33/00*** | (2006.01) |
| ***H01R 24/66*** | (2011.01) |

(56) References Cited

U.S. PATENT DOCUMENTS

| | | | | |
|---|---|---|---|---|
| 4,637,673 A | 1/1987 | Yang | | |
| 5,154,579 A | 10/1992 | Rezek | | |
| 5,883,449 A | 3/1999 | Mehta et al. | | |
| 5,899,663 A * | 5/1999 | Feder | F04D 29/34 | 416/5 |
| 6,015,274 A | 1/2000 | Bias et al. | | |
| 6,146,191 A | 11/2000 | Kerr, Jr. et al. | | |
| 6,171,062 B1 | 1/2001 | Bucher et al. | | |
| 6,322,232 B1 | 11/2001 | Oliver | | |
| 6,398,179 B1 | 6/2002 | Soles | | |
| 6,520,468 B2 * | 2/2003 | Lee | F04D 29/601 | 248/343 |
| 6,682,303 B2 | 1/2004 | Wu | | |
| 6,780,049 B1 * | 8/2004 | D'Angelo | F04D 29/601 | 439/537 |
| 6,872,053 B2 | 3/2005 | Bucher et al. | | |
| 7,249,744 B2 | 7/2007 | Bacon et al. | | |
| 7,261,520 B2 * | 8/2007 | Wang | F04D 25/088 | 248/343 |
| 7,805,815 B2 | 10/2010 | Babian et al. | | |
| 8,025,528 B2 | 9/2011 | Smith | | |
| 8,162,690 B2 | 4/2012 | Smith | | |
| 8,231,403 B2 | 7/2012 | Smith | | |
| 8,316,599 B2 | 11/2012 | Griffiths | | |
| 8,376,777 B2 | 2/2013 | Smith | | |
| 2002/0111063 A1 * | 8/2002 | Kerr | F04D 25/088 | 439/545 |
| 2004/0115062 A1 | 6/2004 | Pearce | | |
| 2005/0272306 A1 * | 12/2005 | Kerr | H02G 3/20 | 439/537 |
| 2006/0263224 A1 | 11/2006 | Wang | | |
| 2006/0274538 A1 * | 12/2006 | Bacon | F21V 17/12 | 362/433 |
| 2006/0278766 A1 * | 12/2006 | Wang | F04D 29/601 | 248/74.1 |
| 2008/0181782 A1 * | 7/2008 | Pearce | F04D 29/601 | 416/244 R |
| 2008/0224013 A1 | 9/2008 | Huang | | |
| 2010/0329885 A1 | 12/2010 | Criner et al. | | |
| 2012/0052722 A1 * | 3/2012 | Smith | H01R 13/625 | 439/529 |
| 2012/0178288 A1 * | 7/2012 | Smith | H02G 3/16 | 439/537 |
| 2015/0176604 A1 * | 6/2015 | Lin | F04D 19/002 | 248/343 |
| 2016/0047391 A1 | 2/2016 | McPherson et al. | | |

FOREIGN PATENT DOCUMENTS

| | | | | |
|---|---|---|---|---|
| CN | 213879524 U * | 8/2021 | | |
| JP | 2005155558 A | 6/2005 | | |
| SG | 193219 A1 * | 9/2013 | F04D 19/002 | |
| SG | 1932191 A1 | 9/2013 | | |
| WO | 0201110 A1 | 1/2002 | | |
| WO | WO-2019180692 A1 * | 9/2019 | F04D 25/088 | |

* cited by examiner

QUICK CONNECT ASSEMBLY FOR CEILING FAN

CROSS-REFERENCE TO RELATED APPLICATION(S)

This application claims priority to and the benefit of and is a continuation of U.S. patent application Ser. No. 16/832,311, filed Mar. 27, 2020, which application claims priority to and the benefit of and is a continuation of U.S. patent application Ser. No. 15/667,700, filed Aug. 3, 2017, now U.S. Pat. No. 10,641,291, issued May 5, 2020, which claims priority to and the benefit of U.S. Provisional Patent Application No. 62/381,893, filed Aug. 31, 2016, all of which are incorporated herein by reference in their entirety.

BACKGROUND OF THE INVENTION

Ceiling fans are used to generate airflow within a space or area, often used for cooling or temperature regulation. Ceiling fans can be used in residential, industrial, commercial or farming environments to circulate air to maintain proper temperature regulation.

Ceiling fans include a motor, provided within a motor housing, for rotating a plurality of blades to produce the air circulation. The motor is typically controlled from a remote location, such as an on/off switch mounted on the wall and electronically coupled to the motor. Additionally, ceiling fans often include a switch housing mounted to the ceiling fan and electronically coupled to the motor. The switching housing can include one or more separate controls, such as a directional switch to determine the rotational direction of the blades. Additionally, pull-strings can mount to the switch housing to selectively operate the ceiling fan or to control a light fixture on the ceiling fan.

The switch housing can mount the motor housing. Servicing of the switch housing requires servicing of the whole fan or mechanical removal of the switch housing from a ceiling fan typically mounted to a ceiling.

BRIEF DESCRIPTION OF THE INVENTION

In a first aspect, the disclosure relates to a quick connect assembly kit for a ceiling fan for mounting a switch housing and a motor housing, with the ceiling fan including a motor with a motor shaft, the quick connect assembly kit comprising: an upper mount secured to either the motor shaft or the motor housing, and the upper mount including an upper plate having a first outer wall extending from the upper plate; a lower mount secured to the switch housing and including a lower plate having a second outer wall extending from the lower plate, complementary with the first outer wall, and with at least one mount hole disposed in the second outer wall; and a fastener insertable through the mount hole; wherein the upper mount is insertable into the lower mount, and releasably attachable to the lower mount with the fastener.

In a second aspect, the disclosure relates to a quick connect assembly kit for a ceiling fan comprising: an upper mount including an upper plate having a first outer wall extending from the upper plate, a lower mount including a lower plate having a second outer wall extending from the lower plate, complementary with the first outer wall, and with at least one mount hole disposed in the second outer wall, and a fastener insertable through the mount hole; wherein the upper mount is insertable into the lower mount with the first outer wall fitting within the second outer wall and releasably attachable to the lower mount with the fastener.

In yet another aspect, a ceiling fan quick connect assembly kit comprising: a motor; a ceiling fan blade rotatable by the motor; an upper mount including an upper plate having a first outer wall extending from the upper plate; a lower mount including a lower plate having a second outer wall extending from the lower plate, complementary with the first outer wall, and with at least one mount hole disposed in the second outer wall; and a fastener insertable through the mount hole; wherein the upper mount is insertable into the lower mount, and releasably attachable to the lower mount with the fastener.

DESCRIPTION OF EMBODIMENTS OF THE INVENTION

The described embodiments of the present invention are directed to systems, methods, and apparatuses related to a quick connect assembly for mounting components of a ceiling fan. It should be understood, however, that the quick connect assembly can have equal applicability in other mounting applications, such as light fixtures, décor, or industrial applications in non-limiting examples.

Figure 1:
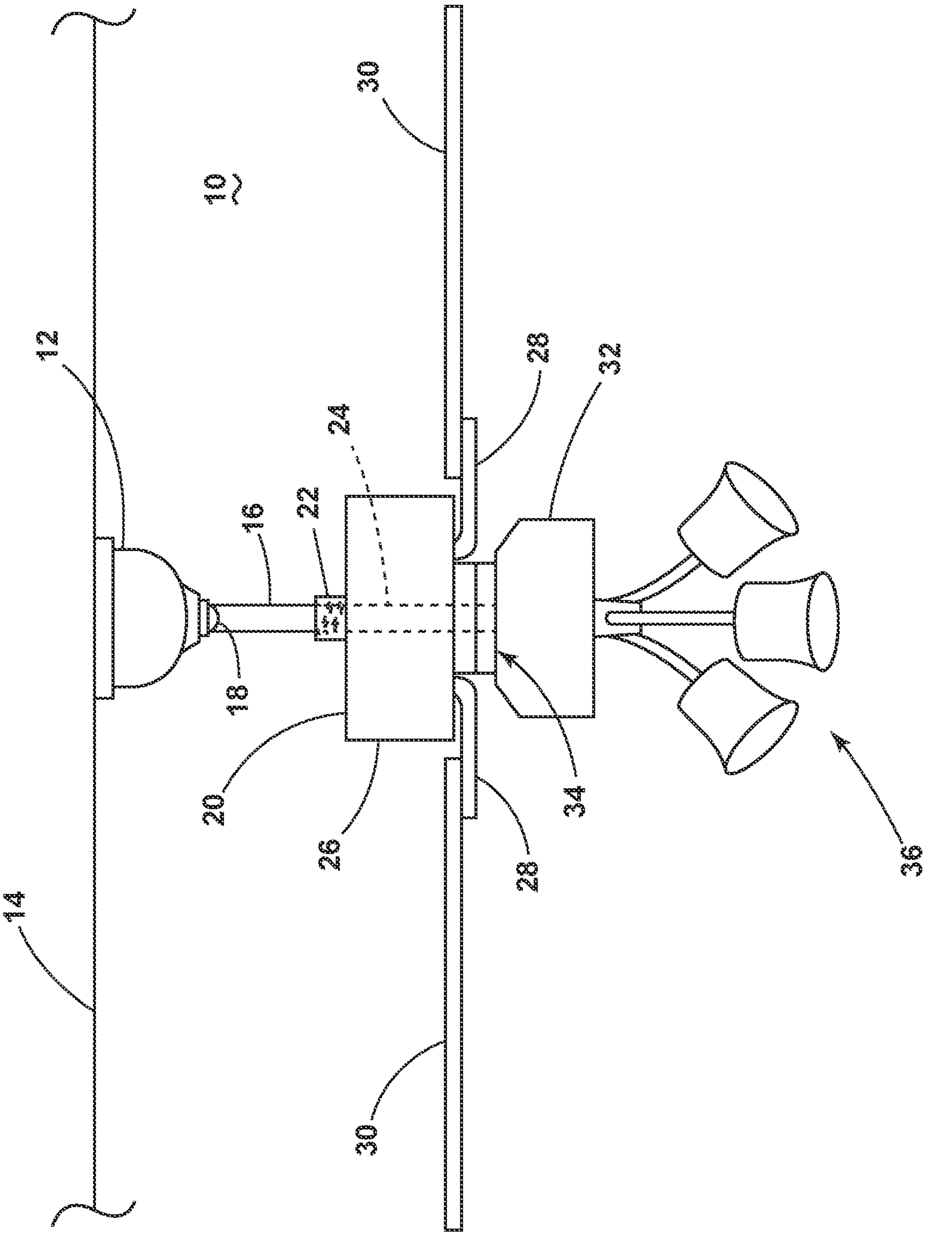
FIG. 1 is side view of an exemplary ceiling fan including a motor housing and switch housing connected by a quick connect mount.

FIG. 1 illustrates a side view of a ceiling fan 10. The ceiling fan 10 includes a ceiling mount structure 12 for mounting to a ceiling 14 or a structure, having a downrod assembly 16 extending therefrom. A ball mount 18 couples the downrod assembly 16 to the mount structure 12. The downrod assembly 16 couples to a motor assembly 20 at a motor coupler 22. The motor coupler 22 fastens the downrod assembly 16 to a motor shaft 24 extending through the motor assembly 20. A motor housing 26 encases the motor assembly 20 and the motor shaft 24. The motor housing 26 houses the motor assembly 20.

A set of blade holders 28 couple a complementary set of blades 30 to the motor assembly 20. The blades 30 are driven by the motor assembly 20 about the motor shaft 24. A typical electric motor in the motor assembly 20 can include a traditional rotor and stator, supplied electricity by building electric supply, with the rotor directly or indirectly coupled to the blades 30 to rotate the blades 30. The electric motor can be of an internal or external rotor configuration, with an external rotor configuration being more common for ceiling fans. While five blades 30 and five blade holders 28 are shown, any number of blades 30 and blade holders 28 are contemplated.

A switch housing 32 can mount to the motor housing 26 opposite of the downrod assembly 16. The switch housing 32 can include electrical wiring coupled to switches, such as for controlling fan speed or rotational direction. Commonly, pull-strings can hang from the switch housing 32 for controlling such operation.

Optionally, a light fixture 36 can mount to the switch housing 32. The light fixture 36 can receive an electrical supply through the switch housing 32. Additionally, the switch housing 32 can operate the light fixture 36 using pull-strings to control the lighting, in one example.

A quick connect assembly 34 can mount the switch housing 32 to the motor shaft 24 through the motor housing 26. Optionally, the switch housing 32 can couple directly to the motor housing via the quick connect assembly 34. Alternatively, the quick connect assembly 34 can mount directly to the motor housing 26, in one non-limiting example. The quick connect assembly 34 provides for a simple and secure connection of the switch housing 32 to the motor housing 26, which can easily be implemented by the home installer.

Figure 2:
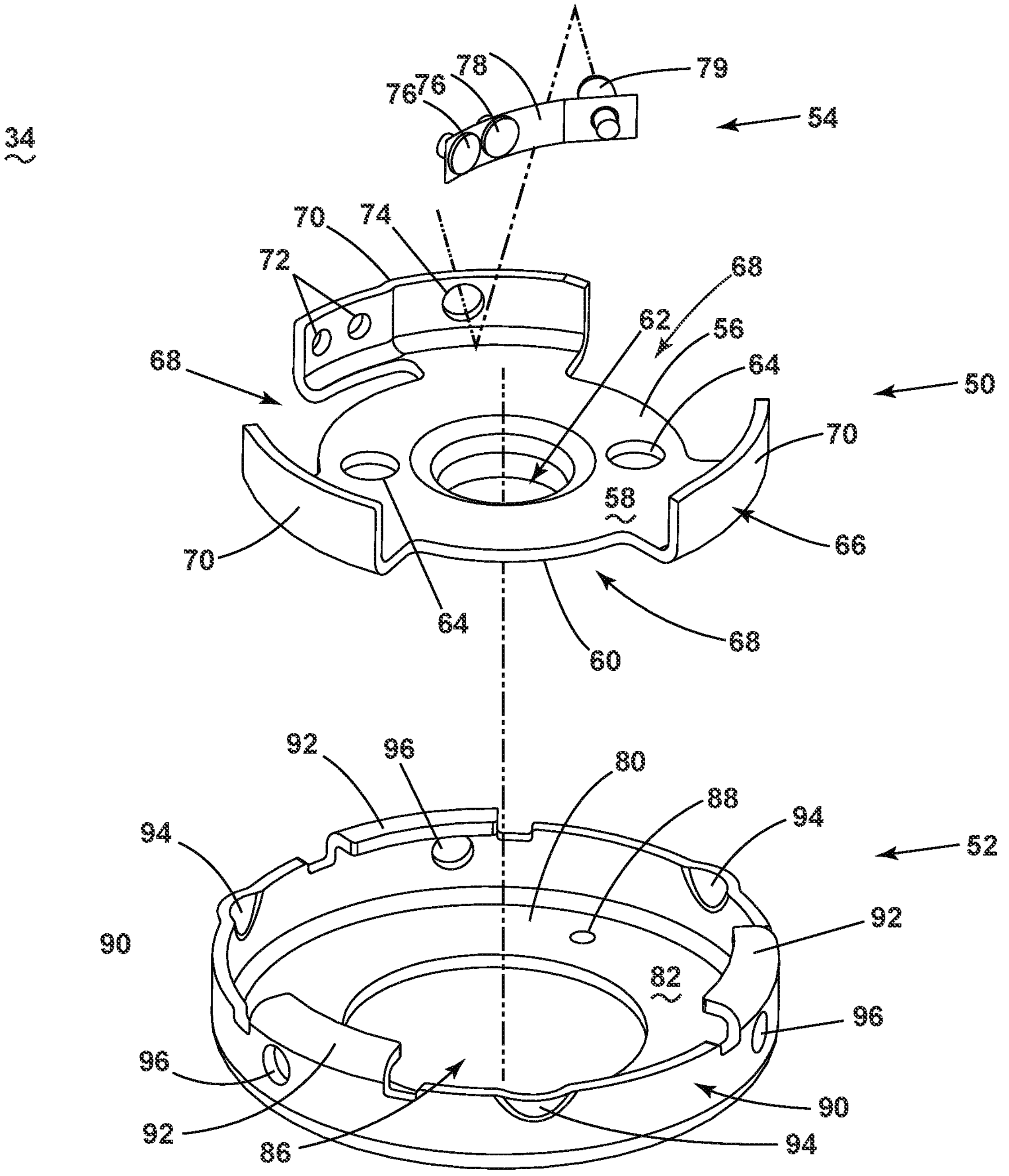
FIG. 2 is an exploded view of the quick connect mount of FIG. 1 including an upper plate, a lower plate, and a pin-lock assembly, according to a first embodiment of the invention.

Referring to FIG. 2, an exploded view of the quick connect assembly 34 illustrates an upper mount 50, a lower mount 52, and a fastener assembly 54. The upper mount 50 can include an upper plate 56. The upper plate 56 can include a first surface 58 and a second surface 60. A central aperture 62 can be disposed in the middle of the upper plate 56. Additional apertures 64 can be disposed radially outside of the central aperture 62. (FIG. 1). Alternatively, the motor shaft 24 (FIG. 1) can extend through the central aperture 62 to couple the upper mount 50 directly to the motor shaft 24.

A first outer wall 66 can extend from the upper plate 56 in the direction of the first surface 58. The outer wall 66 can extend generally perpendicular to the upper plate 56, for example. The outer wall 66 can form an outer peripheral boundary of the upper mount 50. The outer wall 66 can be incomplete, having gaps 68 in the outer wall 66 to define wall sections 70.

One or more wall sections 70 can include mount holes 72 for mounting the fastener assembly 54 to the upper mount 50 and pin holes 74. The fastener assembly 54 can include mount fasteners 76 coupled to a spring finger 78. The mount fasteners 76 can be used to mount the fastener assembly 54 to the wall section 70. A pin 79 can couple to the spring finger 78 for actuating the pin 79. It should be appreciated that while only one wall section 70 includes mount holes 72, any number of wall sections 70 can include mount holes 72 to couple fastener assemblies 54. While the fastener assembly 54 is shown as a spring-type fastener and pin-lock assembly, any suitable fastener assembly is contemplated.

The lower mount 52 can also be substantially circular, including a lower plate 80 having a first surface 82 and a second surface (not shown). A large opening 86 can be disposed in the center of the lower plate 80. Additional fastener openings 88 can be disposed in the lower plate 80. The fastener openings 88 can be used to mount the lower mount 52 to the switch housing 32 (FIG. 1) for example. A second outer wall 90 can extend from the lower plate 80 in the direction of the first surface 82. The second outer wall 90 can extend substantially perpendicular to the lower plate 80, for example. The second outer wall 90 can extend fully around lower plate 80, as an annular peripheral wall, for example, or, like the outer wall 66, it can be non-continuous and formed of discrete segments.

One or more lips 92 can extend radially inwardly, relative to the circular shape of the lower mount 52, shown as three lips 92. The lips 92 can be formed complementary to the wall sections 70 of the upper mount 50. One or more insertion receptacles 94 and one or more fastener holes 96 can be formed in the second outer wall 90, with insertion receptacles 94 and the fastener holes 96 being spaced from one another. The insertion receptacles 94 can be spaced between adjacent lips 92, while the fastener holes 96 can be positioned on the second outer wall 90 beneath the lips 92.

Figure 3:
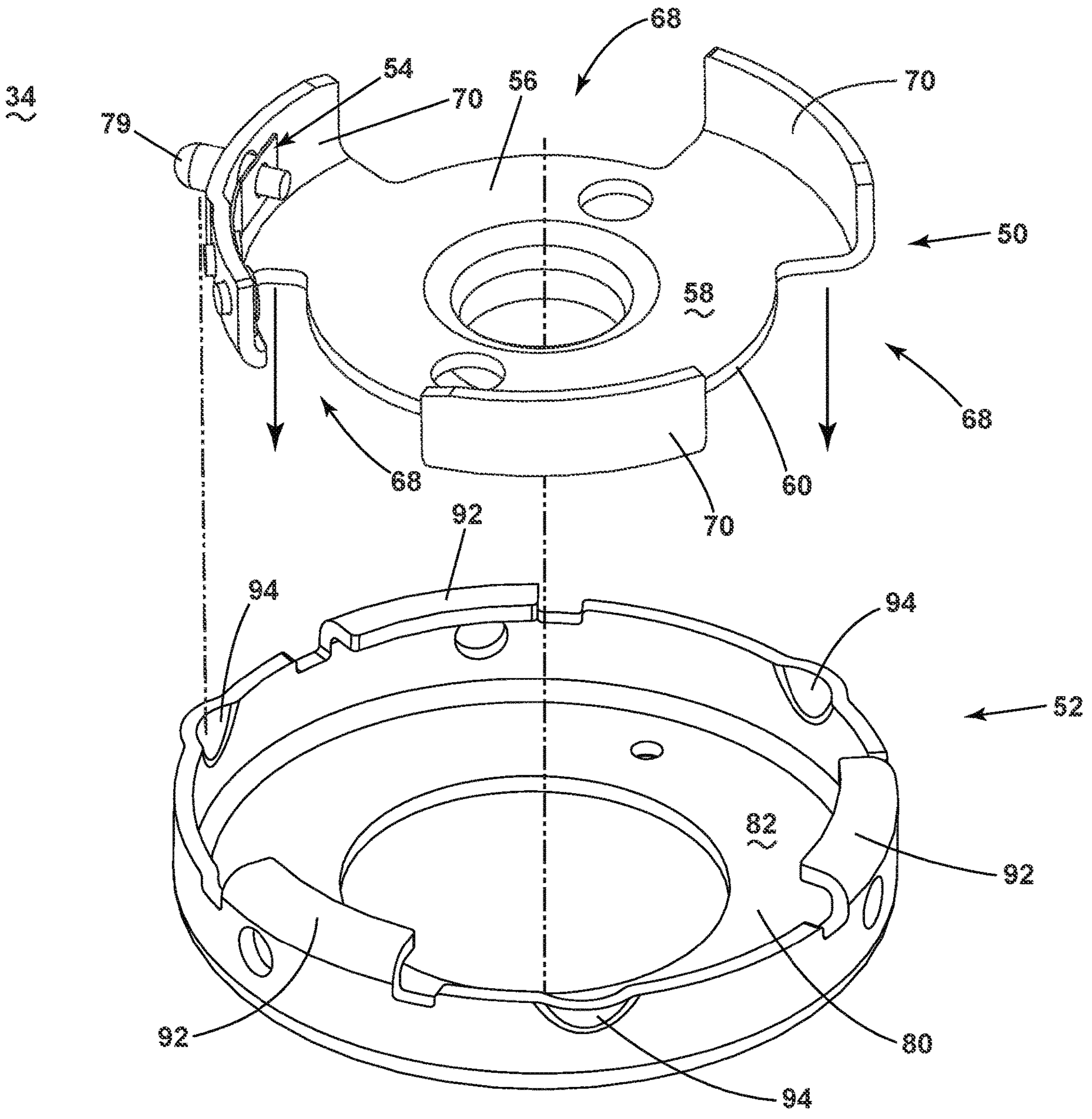
FIG. 3 is the exploded view of FIG. 2 having the pin-lock assembly attached to the upper plate and slightly rotated.

Referring now to FIG. 3, another exploded view of the quick connect assembly 34 is illustrated having the fastener assembly 54 mounted to the upper mount 50. The upper mount 50 has been rotated to vertically align the pin 79 of the fastener assembly 54 with one insertion receptacle 94. The gaps 68 of the upper mount 50 are sized to accept the lips 92 of the lower mount 52 during insertion of the upper mount 50 into the lower mount 52. Additionally, the insertion receptacles 94 are adapted to align with the pin 79 of the fastener assembly 54 extending from the wall sections 70 aligned between the lips 92.

In operation, the upper mount 50 can be placed within the lower mount 52. The lower mount 52 can be sized to accept insertion of the upper mount 50. During insertion of the upper mount 50 into the lower mount 52, pin 79 contacts the insertion receptacle 94. The spring finger 78 can flex to permit movement of the pin 79 radially inwardly of the first outer wall 66. The insertion receptacle 94 defines a keyed attachment for the upper and lower mount 50, 52.

Figure 4:
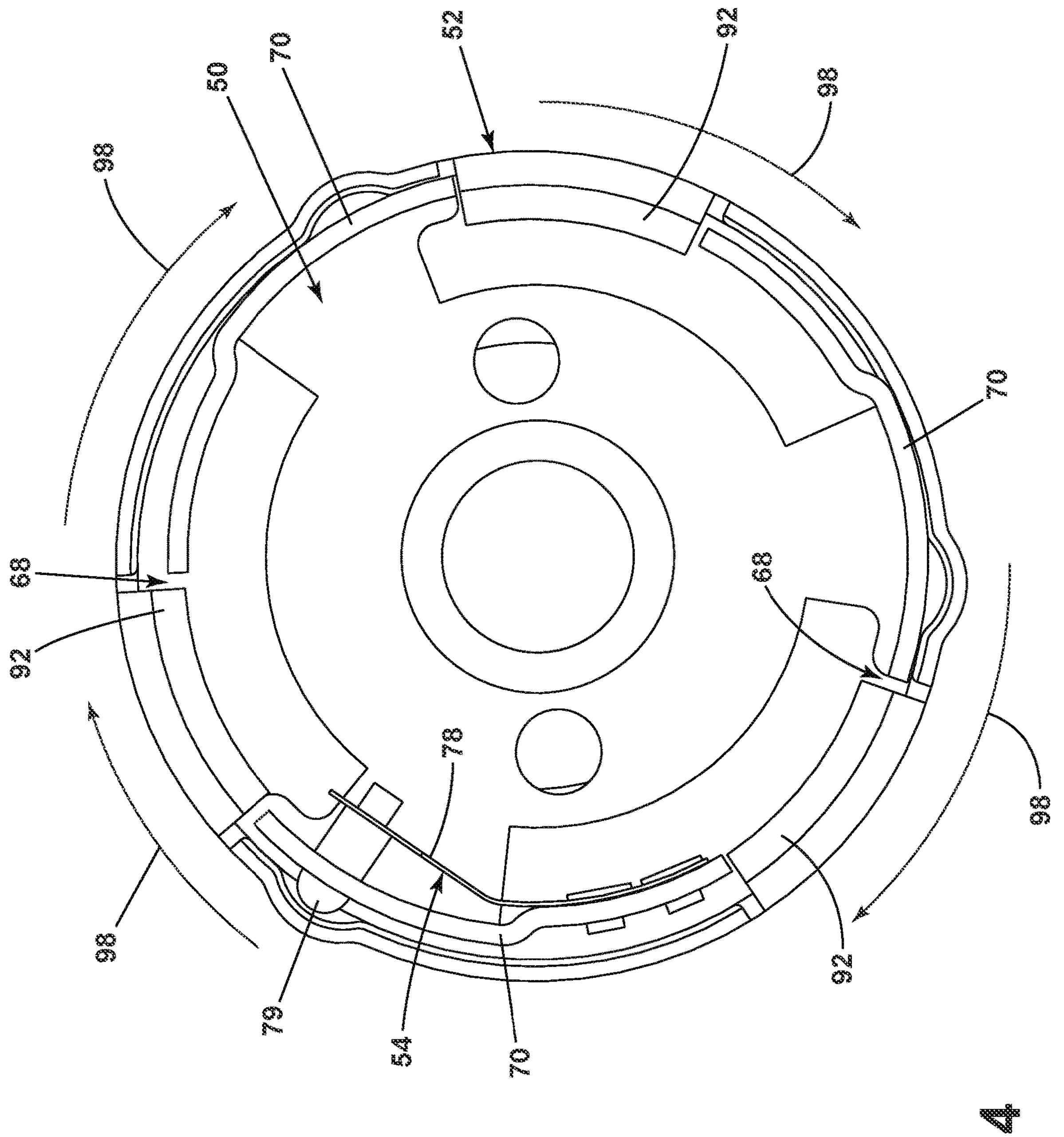
FIG. 4 is a top view of the combined quick connect assembly of FIG. 3 in an assembled, unlocked position.

Upon insertion, the second surface 60 of the upper plate 56 contacts the first surface 82 of the lower plate 80. Referring now to FIG. 4, a top view of the upper mount 50 inserted into the lower mount 52 is illustrated. The pin 79 of the fastener assembly 54 is compressed by the insertion receptacle 94. The wall sections 70 are disposed between the lips 92, permitting the full upper mount 50 to be within the lower mount 52.

Figure 5:
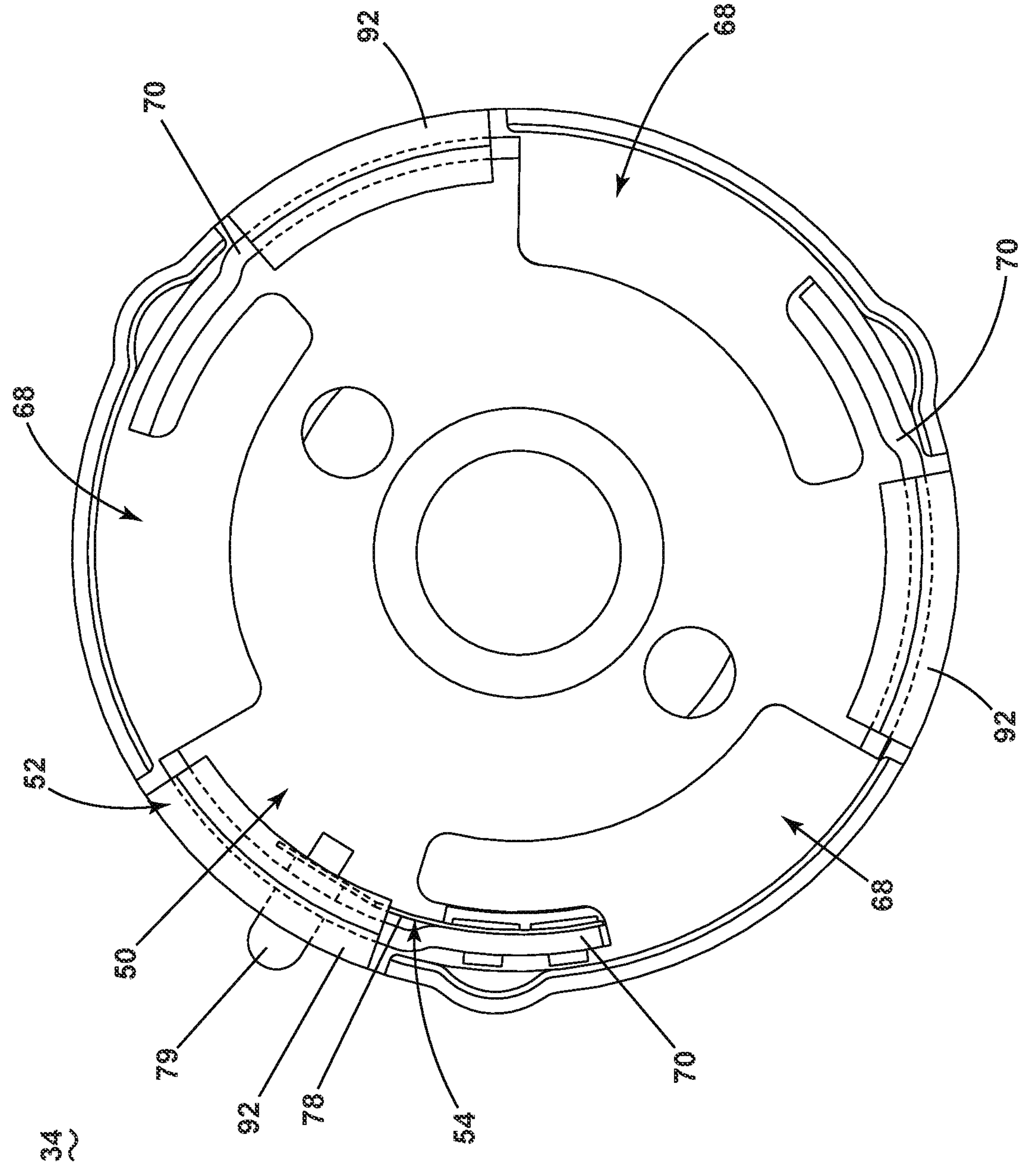
FIG. 5 is a top view of the quick connect assembly of FIG. 4 rotated into a locked position.

After insertion of the upper mount 50 into the lower mount 52, one mount can be rotated to lock the mounts 50, 52 together. The upper mount 50 can be rotated clockwise or the lower mount 50 can be rotated counter-clockwise. As shown by rotational arrows 98, the upper mount 50 can be rotated in a clockwise direction. Rotation of the upper mount 50 can slide the wall sections 70 underneath the lips 92. During rotation, the wall sections 70 are slid under the lips 92 until the pin 79 inserts into the fastener hole 96 of the lower mount 52, in the position shown in FIG. 5. The spring finger 78 pushes the pin 79 through the fastener hole 96 to lock the upper mount 50 to the lower mount. In the position in FIG. 5, the upper and lower mounts 50, 52 are prevented from rotating relative to one another with the pin 79. Additionally, the lips 92 hold the upper mount 50 within the lower mount 52 at the wall sections 70 preventing vertical movement of the mounts 50, 52 relative to one another. As such, the mounts 50, 52 are locked together to form the locked quick connect assembly 34.

Separating the mounts 50, 52 from one another is accomplished by pressing the pins 79, such as by the user pushing the pins 79 inwardly. The spring finger 78 actuates to unlock the mounts 50, 52 at the fastener assembly 54. Then, rotating the mounts 50, 52 in the reverse direction as shown in FIG.

4 until the mounts 50, 52 are returned to the position of FIG. 4 permits separation of the upper mount 50 from within the lower mount 52 to de-couple the two mounts 50, 52.

As such, it should be appreciated that connecting of the quick connect assembly 34 simply requires aligning the gaps 68 of the upper mount 50 with the lips 92 of the lower mount 52 and twisting one of the mounts 50, 52 until the pin 79 locks into the fastener hole. Disconnecting the quick connect assembly 34 requires pushing the pin 79 to release the fastener assembly 54 and twisting the two mounts 50, 52 to align the gaps 68 again with the lips 92. Thus it should be appreciated that a secure mount is quickly and easily achieve with the quick connect assembly 34 that is quickly and easily releasable by user operation.

Figure 6:
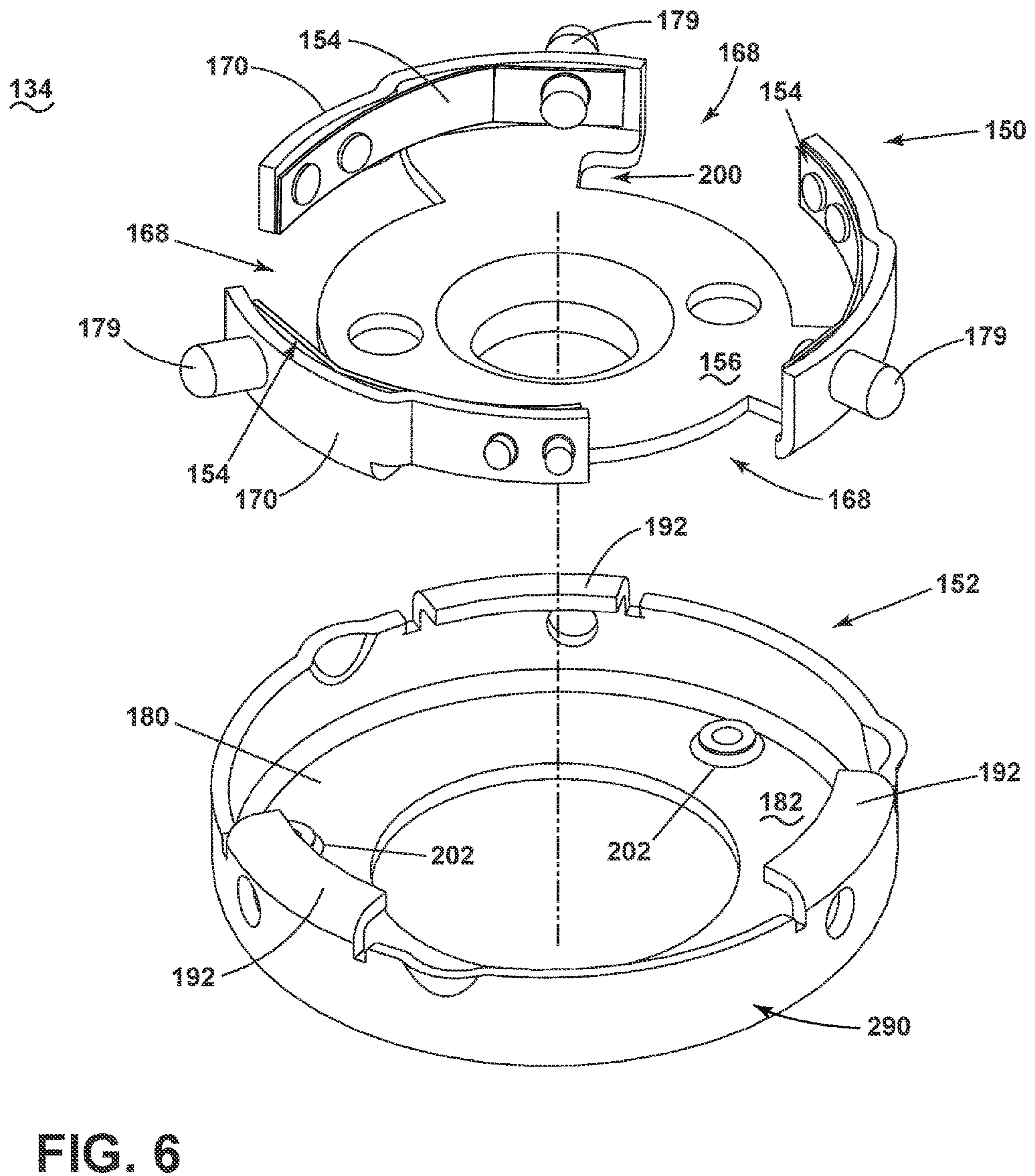
FIG. 6 is an exploded view of a quick connect assembly having multiple pin-lock fasteners and a stopper.

Referring now to FIG. 6, another quick connect assembly 134 is illustrated. The quick connect assembly 134 can be substantially similar to the quick connect assembly 34 of FIGS. 2-5. As such, similar numerals will be used to describe similar elements increased by a value of one-hundred.

The quick connect assembly 134 can include three fastener assemblies 154 mounted to the wall sections 170 of the upper mount 150. The gaps 168 can extend partially into the upper plate 156, to define a seat 200. The lower mount 152 can include one or more stoppers 202 disposed along the lower plate 180 extending from the first surface 182. The seats 200 can be sized to receive the stoppers 202. During rotational connecting of the upper and lower mounts 150, 152, the stoppers 202 rotate into the seats 200, preventing over rotation of the mounts 150, 152 and defining a limit to the rotation. Additionally, the using the seats 200 and the stoppers 202 limits the rotation to a keyed pattern, preventing unwanted rotation, which may damage elements of the quick connect assembly 134.

The use of multiple fastener assemblies 154 provides for a redundant locking system. In the event that a pin 179 or lip 192 can shear or break, the remaining pins 179 or lips 192 prevent failure of the quick connect assembly 134.

Figure 7:
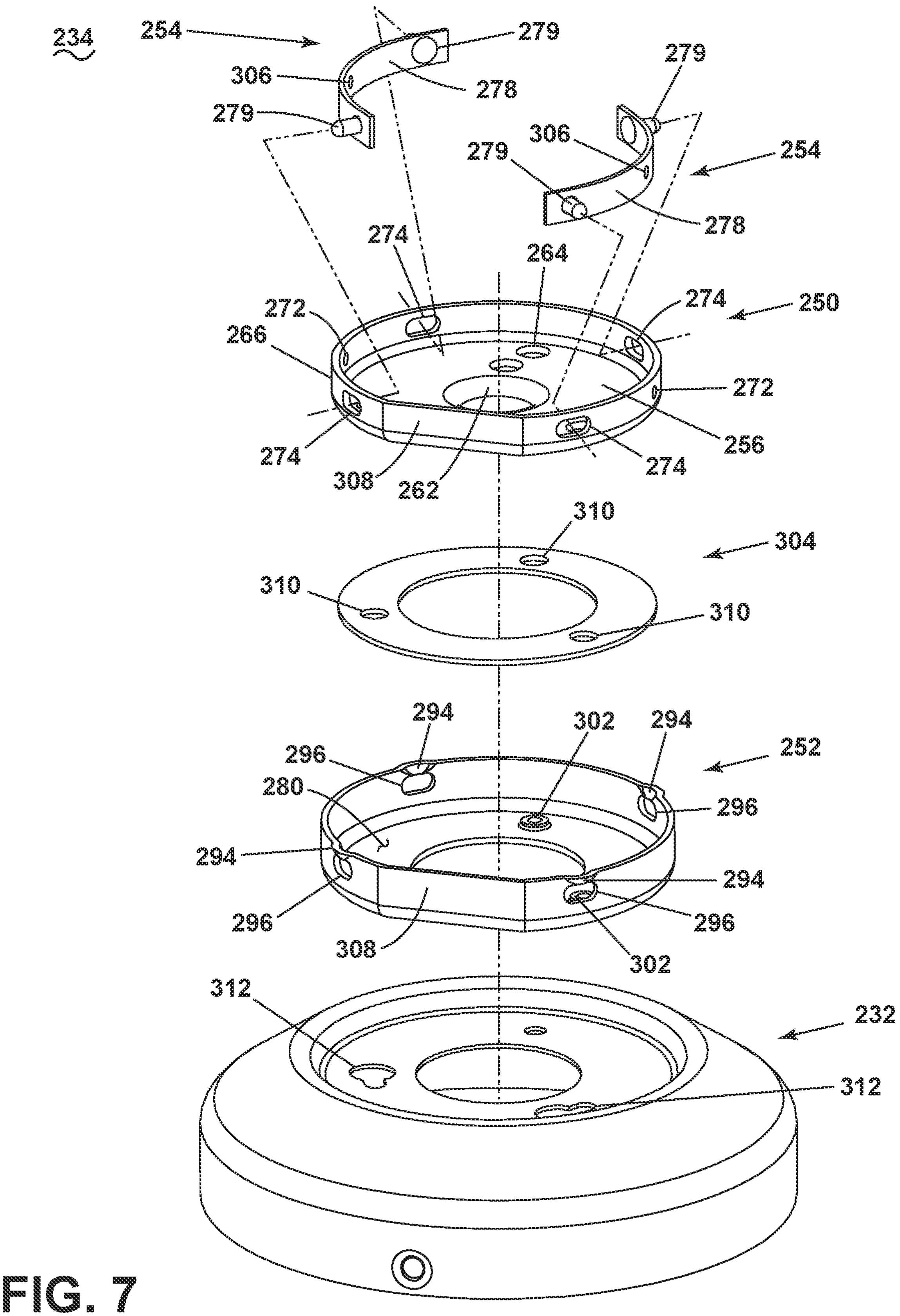
FIG. 7 is an exploded view of a quick connect assembly and a top of the switch housing, with the quick connect assembly including detachable pin-lock assemblies.
Figure 8:
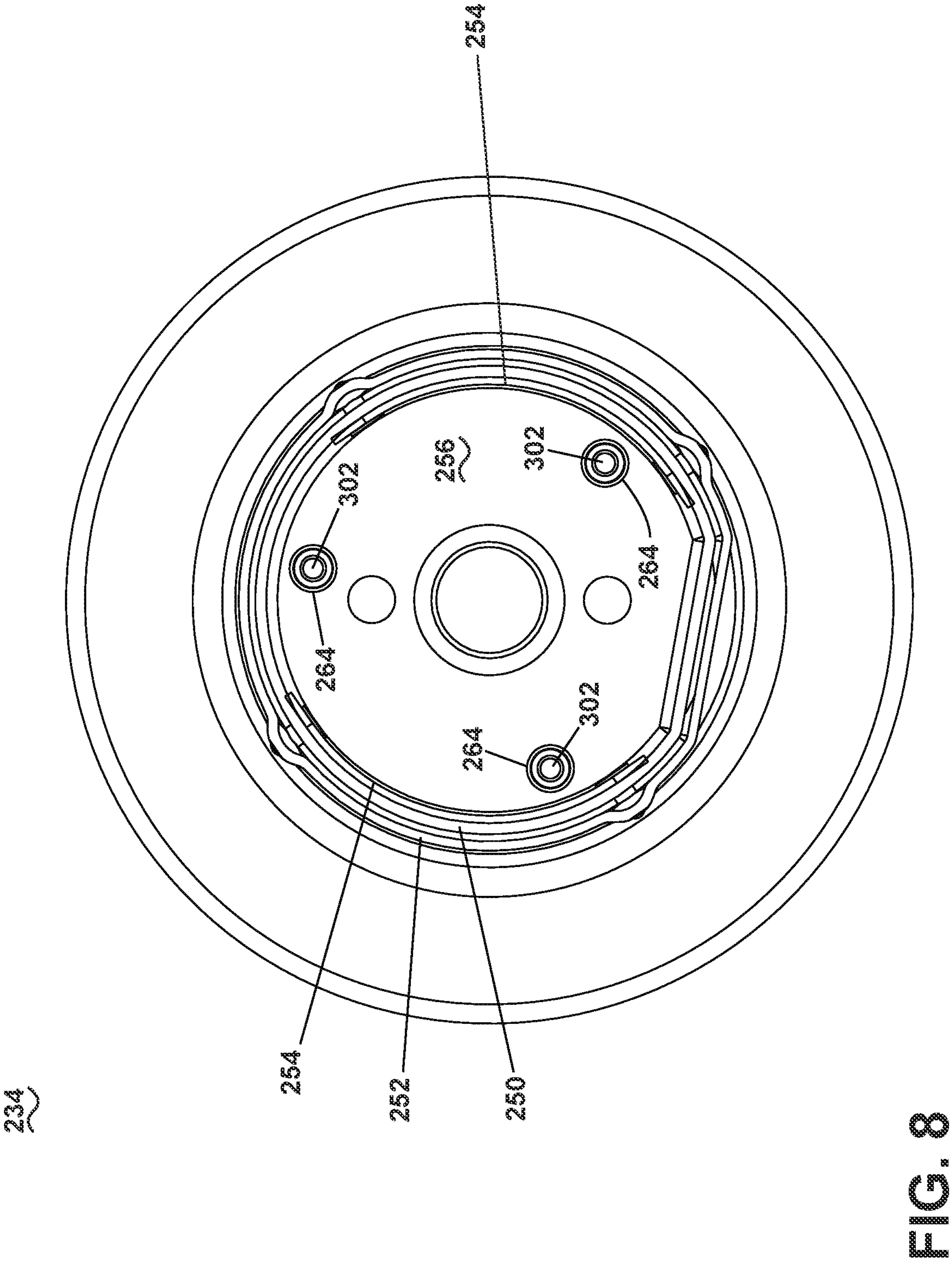
FIG. 8 is a top view of the assembled quick connect assembly of FIG. 7

Referring now to FIGS. 7-8, another alternative quick connect assembly 234 is illustrated. The quick connect assembly 234 of FIG. 7 can be substantially similar to that of the quick connect assembly 134 of FIG. 6. As such, similar elements will be identified with similar numerals increased by a value of one hundred.

Referring to FIG. 7, the quick connect assembly 234 includes two fastener assemblies 254, an upper mount 250, a gasket 304, and a lower mount 252. Additionally, the top portion of a switch housing 232 is illustrated for coupling to the lower mount 252. Each fastener assembly 254 includes a spring finger 278 and two pins 279, as well as a fastener hole 306.

The upper mount 250 includes an upper plate 256 with a central aperture 262 and a first outer wall 266. The upper plate 256 includes fastener apertures 264 for mounting the upper plate 256 to a motor housing 26 (FIG. 1) for example. The first outer wall 266 includes a flat portion 308. The outer wall includes mount holes 272 and pin holes 274 for mounting the fastener assembly 254. The mount holes 272 can be used to mount the fastener assemblies 254 to the upper mount 250.

The gasket 304 can be circular, having a diameter relative to that of the upper mount 250. Stopper holes 310 can be provided in the gasket 304 for aligning the gasket 304 to the lower mount 252.

The lower mount 252 includes a lower plate 280 with a second outer wall 290. The second outer wall includes the flat portion 308 similar to the upper mount 250, making a keyed combination for the upper and lower mounts 250, 252. One or more stoppers 302 can be formed in or coupled to the lower plate 280. The stoppers 302 can be complementary to the stopper holes 310 in the gasket 304. Insertion receptacles 294 can be provided in the second outer wall 290, having fastener holes 296 aligned below the insertion receptacles 294. The switch housing 232 can include mount holes 312 for mounting the lower mount 252 to the switch housing 232.

In combination, the fastener assemblies 254 mount to the upper mount 250. The lower mount 252 can mount to the switch housing 232. The gasket 304 can mount to the lower mount 252, such as by fastening as the stoppers 302 with a fastener.

In operation, the upper mount 250 can insert into the lower mount 252 in the keyed position as defined by the flat portions 308. The keyed flat portions 308 align the pins 279 of the fastener assemblies 254 with the insertion receptacles 294 and the fastener holes 296 to permit the insertion and locking of the upper plate 256 to the lower plate 280. In this example, only the vertical insertion of the upper mount 250 into the lower mount 252 is required to connect the quick connect assembly 234, as opposed to the twisting requirement of the prior examples.

Referring now to FIG. 8, a top view of the quick connect assembly 234 illustrates the combined quick connect assembly 234. The upper mount 250 is sized to fit within the lower mount 252, and aligning the stoppers 302 with the fastener apertures 264 of the upper plate 256.

Figure 9:
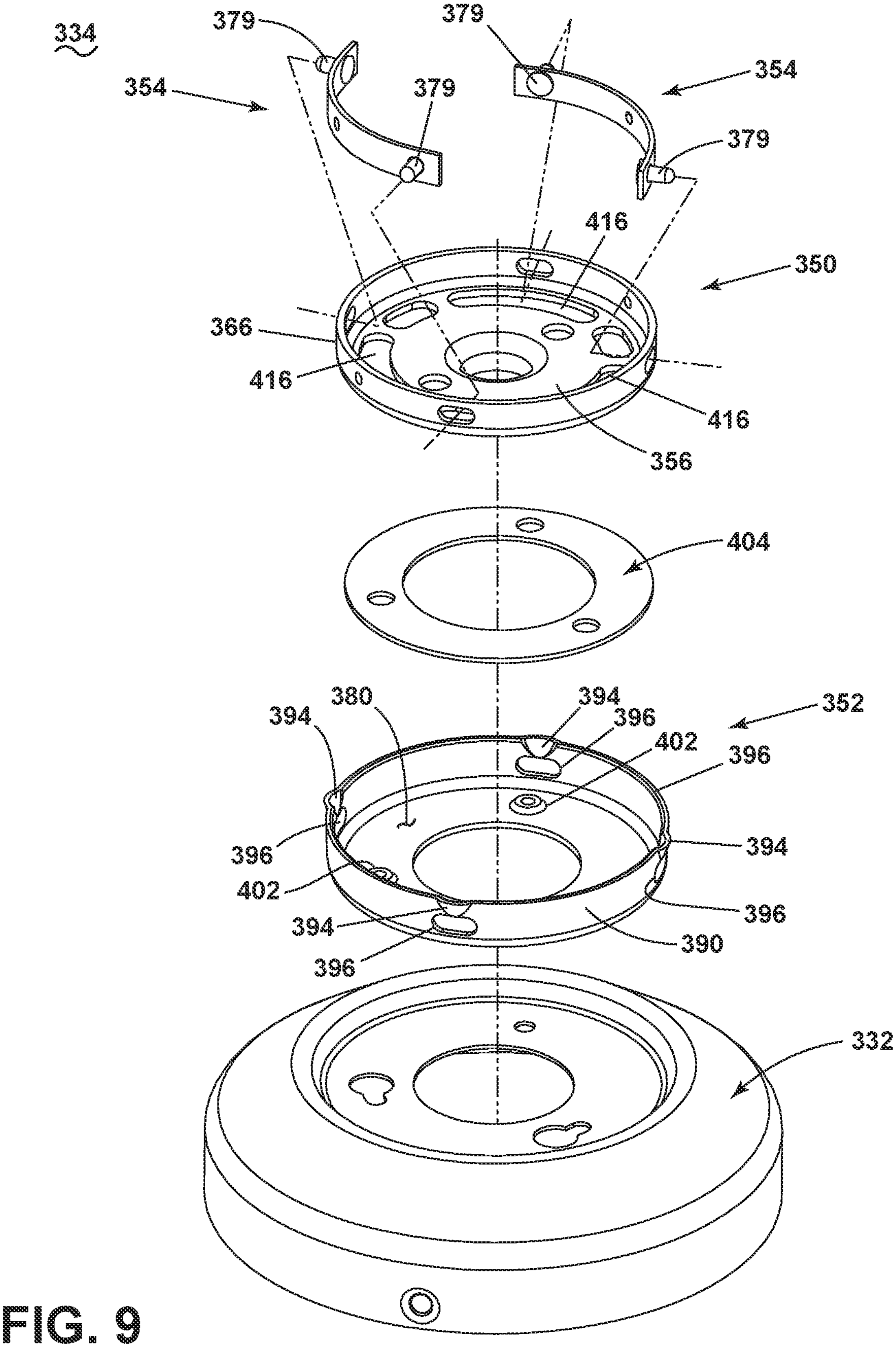
FIG. 9 is an exploded view of another quick connect assembly and a top of the switch housing including multiple stoppers with sliding grooves.
Figure 10:
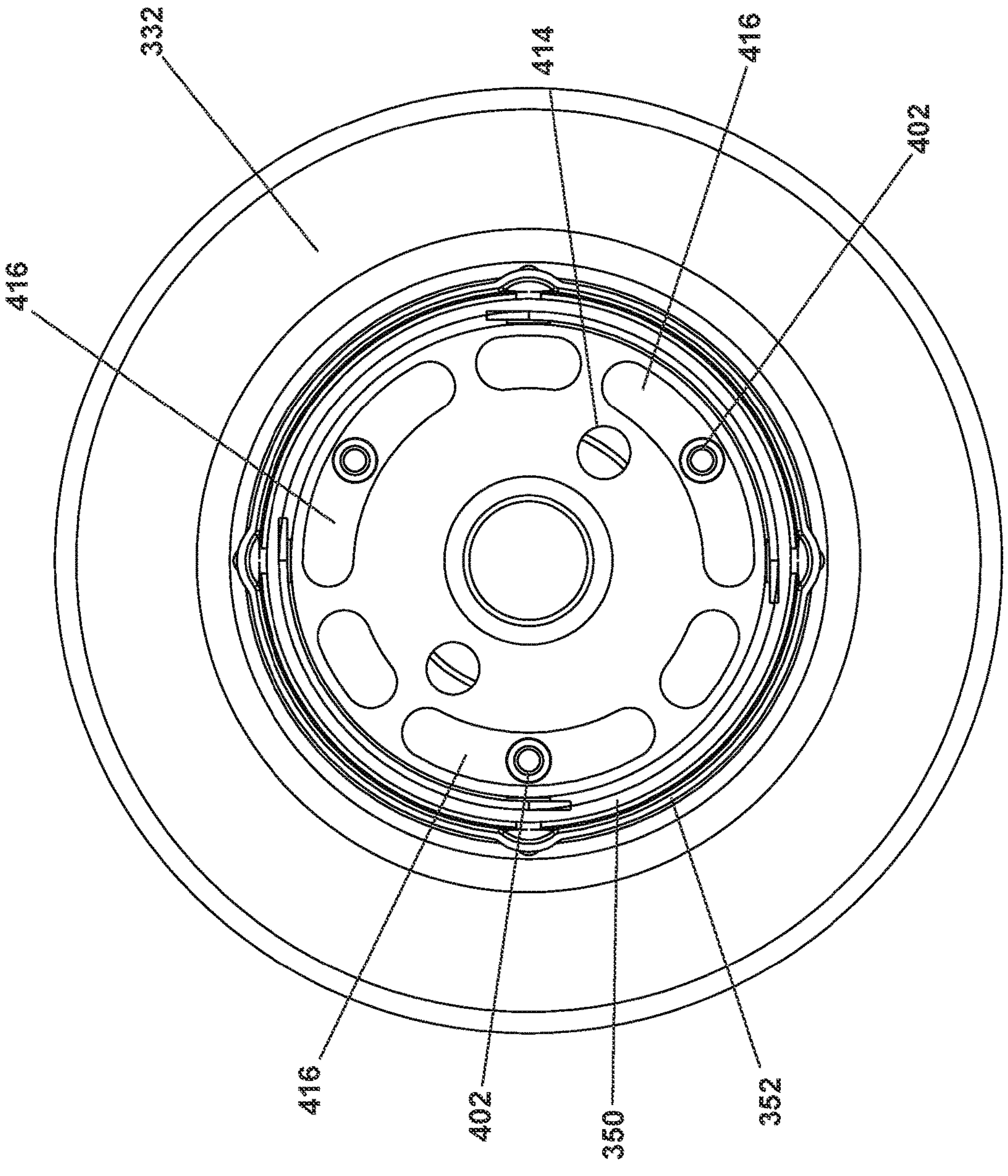
FIG. 10 is a top view of the assembled quick connect assembly of FIG. 9.

Referring now to FIGS. 9-10, another exemplary quick connect assembly 334 is illustrated. The quick connect assembly 334 can be substantially similar to the quick connect assembly 234 of FIGS. 7-8. As such, similar numerals will be used to describe similar elements increased by a value of one hundred.

In FIG. 9, the quick connect assembly 334 includes two fastener assemblies 354, an upper mount 350, a gasket 404, and a lower mount 352. The upper mount 350 and the lower mount 352 includes first and second outer walls 366, 390, respectively. The upper mount 350 can be inserted into the periphery of the lower mount 352 in any position as defined by the second outer wall 390. The upper plate 356 includes elongated, arcuate apertures 416. The apertures 416 provide for the stopper 402 of the lower mount 352 to rotate respective of the upper mount 350. While the insertion receptacles 394 and fastener holes 396 are aligned, the quick connect assembly 334 provides for unaligned combination of the upper and lower mounts 350, 352. Then, rotation of the upper or lower mounts 350, 352 relative to the other locates the pins 379 into the fastener holes 396 to secure the mounts 350, 352 to one another.

In FIG. 10, having the upper mount 350 coupled to the lower mount 352. As is appreciable, the arcuate apertures 416 provide for rotation of the mounts 350, 352 relative to one another with the stopper 402 moving along the apertures 416.

A method of mounting a switch housing to a ceiling fan motor housing can include (1) inserting an upper mount 50 into a lower mount 52, and (2) rotating the upper or lower mount 50, 52 to lock the upper mount 50 to the lower mount 52. Inserting the upper mount 50 into the lower mount 52 can include the combination of the mounts 50, 52 as shown and described in FIG. 3. Rotating the mounts to lock the mounts can include rotating the upper and lower mounts 50, 52 as shown and described in FIG. 4. The rotating can include moving the pin 79 into the insertion receptacle 94 to lock the upper and lower mounts 50, 52.

The method can further include aligning the upper mount 50 and the lower mount 52 based upon a keyed combination, such as aligning the gaps 68 with the lips 92 in FIGS. 2-5 to permit insertion of the upper and lower mounts 50, 52.

An additional method of mounting a switch housing to a ceiling fan motor housing, can include (1) inserting an upper mount 250 into a lower mount 252 with keyed portions of the upper and lower mounts 250, 252 in registry and (2) locking the upper mount 250 to the lower mount 252 when the keyed portions are in registry. Inserting the upper mount 250 into the lower mount 252 can include the combination of the mounts 250, 252 as shown and described in FIG. 7 where the keyed portions are the keyed flat portions 308. Locking the upper mount 250 to the lower mount 252 can include receiving the pin 279 within the insertion receptacle 294 and then snapping the pin 279 within the fastener hole 296.

The additional method can further include the pin 279 being automatically aligned with the receptacle 294 when the keyed portions are in registry where the keyed flat portion 308 of the upper mount 250 is aligned with the keyed flat portion 308 of the lower mount 252.

The methods described herein can further include mounting the upper mount 50 to the motor housing 26 or mounting the lower mount 52 to the switch housing 32. As such, connecting the upper and lower mounts 50, 52 effectively mounts the switch housing 32 to the motor housing 26 for assembling a ceiling fan, as opposed to requiring the user to provide tools or organize fasteners. Additionally, the manufacturer is not required to pre-assemble the parts, saving costs.

It should be appreciated that the quick connect assemblies as described herein provide for quick and easy connects or disconnection of elements for coupling parts of a ceiling fan. The quick connect assemblies provide for secure mounting of the elements, while facilitating connection and disconnection as is desirable.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A ceiling fan kit comprising:
- a plurality of ceiling fan elements comprising:
  - a mounting bracket,
  - a canopy,
  - a downrod,
  - a switch housing,
  - a motor housing,
  - a motor with a motor shaft,
  - a plurality of blades; and
- a quick connect assembly securing one of the ceiling fan elements to another of the ceiling fan elements, the quick connect assembly comprising:
  - an upper mount, configured to secure to the one of the ceiling fan elements, including an upper plate having a first outer wall extending from the upper plate,
  - a lower mount, configured to secure to the other of the ceiling fan elements, including a lower plate having a second outer wall extending from the lower plate, complementary with the first outer wall, and with at least one mount hole disposed in the second outer wall, and
  - a fastener insertable through the mount hole,
  - wherein the upper mount is insertable into the lower mount, and releasably attachable to the lower mount with the fastener.

2. The ceiling fan kit of claim 1 wherein the first outer wall extends from the upper plate substantially perpendicular to the upper plate.

3. The ceiling fan kit of claim 1 wherein the second outer wall includes one or more lips extending from the second outer wall.

4. The ceiling fan kit of claim 3 wherein the first outer wall is rotatably receivable by the lips to mount the upper plate and the lower plate to one another.

5. The ceiling fan kit of claim 4 wherein the mount hole is aligned with at least one of the lips.

6. The ceiling fan kit of claim 1 wherein the second outer wall includes an insertion receptacle adapted to accept the fastener.

7. The ceiling fan kit of claim 6 wherein the insertion receptacle defines a keyed attachment for the upper mount and the lower mount.

8. The ceiling fan kit of claim 6 wherein the fastener, the insertion receptacle, and the mount hole comprise a pin-lock assembly.

9. The ceiling fan kit of claim 8 wherein the fastener is a spring-type fastener being actuable for insertion at the insertion receptacle and to secure within the mount hole.

10. The ceiling fan kit of claim 9 wherein multiple fasteners are coupled to the first outer wall of the upper mount.

11. The ceiling fan kit of claim 1 further comprising a gasket disposed between the upper mount and the lower mount.

12. The ceiling fan kit of claim 1 wherein the upper plate includes a central aperture adapted to receive the motor shaft.

13. The ceiling fan kit of claim 1 wherein the upper plate is mountable to the motor housing and the lower plate is mountable to the switch housing.

14. A ceiling fan kit comprising:
- a plurality of ceiling fan elements comprising:
  - a mounting bracket,
  - a canopy,
  - a downrod,
  - a switch housing,
  - a motor housing,
  - a motor with a motor shaft,
  - light kit; and
- a quick connect assembly securing one of the ceiling fan elements to another of the ceiling fan elements, the quick connect assembly comprising:
  - an upper mount, configured to secure to the one of the ceiling fan elements, including an upper plate having a first outer wall extending from the upper plate,
  - a lower mount, configured to secure to the other of the ceiling fan elements, including a lower plate having a second outer wall extending from the lower plate, complementary with the first outer wall, wherein the second outer wall includes one or more lips extending from the second outer wall,
  - wherein the upper mount is insertable into the lower mount with the first outer wall fitting within the second outer wall and the first outer wall is rotatably receivable by the lips to mount the upper plate and the lower plate to one another.

15. The ceiling fan kit of claim 14 further comprising a pin-lock assembly locking the relative rotation of the upper and lower mounts.

16. The ceiling fan kit of claim 15 wherein the pin-lock assembly comprises a spring-type fastener on one of the first and second outer walls and a complementary receiver on the other of the first and second outer wall.

17. The ceiling fan kit of claim 14 further comprising a gasket disposed between the upper mount and the lower mount.

18. The ceiling fan kit of claim 14 wherein the upper plate includes a central aperture adapted to receive the motor shaft.

19. The ceiling fan kit of claim 14 wherein the upper plate is mountable to the motor housing and the lower plate is mountable to the switch housing.

* * * * *